(12) United States Patent
Uhlir-Tsang et al.

(10) Patent No.: US 7,976,623 B2
(45) Date of Patent: *Jul. 12, 2011

(54) INK-JET INKS CONTAINING SULFONATED AROMATIC COMPOUNDS FOR REDUCING OZONE FADE

(75) Inventors: Linda C Uhlir-Tsang, Corvallis, OR (US); Marlene Ann McGorrin, Corvallis, OR (US); John R Moffatt, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1617 days.

This patent is subject to a terminal disclaimer.

(21) Appl. No.: 11/109,899

(22) Filed: Apr. 19, 2005

(65) Prior Publication Data

US 2006/0233976 A1    Oct. 19, 2006

(51) Int. Cl.
*C09D 11/02* (2006.01)

(52) U.S. Cl. .................. 106/31.43; 106/31.75

(58) Field of Classification Search ........... 106/31.43, 106/31.75
See application file for complete search history.

(56) References Cited

U.S. PATENT DOCUMENTS

| | | | | |
|---|---|---|---|---|
| 4,163,675 A * | 8/1979 | Hirano et al. | ............ | 106/31.43 |
| 5,096,489 A * | 3/1992 | Laver | ............ | 106/31.47 |
| 5,127,947 A * | 7/1992 | Takimoto et al. | ........... | 106/31.48 |
| 5,226,957 A * | 7/1993 | Wickramanayake et al. | ............ | 106/31.26 |
| 5,509,957 A | 4/1996 | Toan et al. | | |
| 6,015,455 A * | 1/2000 | Yano et al. | ............ | 106/31.58 |
| 6,319,309 B1 * | 11/2001 | Lavery et al. | ............ | 106/31.27 |
| 7,279,034 B2 | 10/2007 | Oki et al. | | |
| 2003/0116058 A1 | 6/2003 | Hopper et al. | | |
| 2003/0116059 A1 | 6/2003 | Nguyen et al. | | |
| 2004/0114014 A1 | 6/2004 | Sato et al. | | |
| 2004/0194661 A1 | 10/2004 | Taguchi et al. | | |
| 2005/0183630 A1 * | 8/2005 | Oki et al. | ............ | 106/31.49 |
| 2007/0095250 A1 * | 5/2007 | Uhlir-Tsang et al. | ........ | 106/31.27 |

FOREIGN PATENT DOCUMENTS

| | | |
|---|---|---|
| EP | 1 239 013 A | 9/2002 |
| EP | 1239013 A1 * | 9/2002 |
| EP | 1 634 930 A | 3/2006 |
| JP | 1990-311573 | 12/1990 |
| JP | 1991-91574 | 4/1991 |
| WO | WO 2005-030885 A1 | 4/2005 |

OTHER PUBLICATIONS

JP OA dated Nov. 4, 2009.

* cited by examiner

*Primary Examiner* — Jerry Lorengo
*Assistant Examiner* — Veronica F Faison Gee

(57) ABSTRACT

In accordance with embodiments of the present invention, an ink-jet ink can comprise a dye and a liquid vehicle carrying the dye. The liquid vehicle can include a sulfonated aromatic compound present in the ink-jet ink at an effective concentration to cause improvement of ozone fastness of said ink-jet ink.

50 Claims, No Drawings

INK-JET INKS CONTAINING SULFONATED AROMATIC COMPOUNDS FOR REDUCING OZONE FADE

FIELD OF THE INVENTION

The present invention relates generally to ink-jet inks containing sulfonated aromatic compounds. More particularly, the present invention relates to ink-jet inks having improved ozone fastness when printed on photo media, such as semi-metal oxide or metal oxide-containing porous media or other types of photo media.

BACKGROUND OF THE INVENTION

In ink-jet technology, image quality of high-resolution images can be a function of both the ink-jet ink used to produce an image, and the print medium upon which the image is printed. Desirable attributes of print quality include saturated colors, high gloss and gloss uniformity, and freedom of grain and coalescence, among other characteristics.

Once a high-resolution image is printed, however, another major issue arises, namely, image permanence relating to how long the quality of the image will last. As the photo industry continues to move from film to digital imaging, the issue of image permanence becomes more important.

With respect to much of the print media currently on the market, printed images commonly have undesirable attributes in the area of image permanence. One such undesirable attribute is the gradual colorant-fade observed when dye-based ink-jet inks are printed on porous media. Such fade has been shown to be caused by air, and more particularly, by small amounts of ozone in the air. It appears that, over time, ozone reacts with many dyes commonly used in ink-jet inks, thus causing them to break down and to lose or diminish their intended color properties. It should be noted that dye-fade is more of a problem with certain dyes compared to others. For example, copper phthalocyanine dyes tend to be affected to a greater extent by the presence of ozone in the air than do other dye classes.

Along with dye-fade, another significant undesirable attribute is color-shift. It has been observed that when ozone reacts with some dyes, a color hue shift occurs. This effect causes a gradual change in the perceived colors of the printed image from what was originally printed.

Both of these undesirable attributes, dye-fade and color-shift, gradually modify the perception of the printed image. Because the printed image is susceptible to these significant changes over time, many have been reluctant, especially in the graphics arts and photography industries, to embrace ink-jet printing of images intended to last for a significant period of time.

As such, it would be beneficial to develop ink-jet inks that can be printed on photo media, e.g., semi-metal oxide or metal oxide-containing porous media, while minimizing the effects of exposure to atmospheric ozone.

SUMMARY OF THE INVENTION

It has been recognized that it would be advantageous to improve ozone fastness by including certain compounds in ink-jet inks. In accordance with this, an ink-jet ink can comprise a dye and a liquid vehicle carrying the dye. The liquid vehicle can include a sulfonated aromatic compound present in the ink-jet ink at an effective concentration to cause improvement of ozone fastness of the ink-jet ink. The improvement is determined by comparing the ozone fastness of the ink-jet ink with a control ink-jet ink that does not include the sulfonated aromatic compound.

In another embodiment, a printing system for creating images with improved ozone fastness can comprise a printing medium including an ink-receiving layer coated thereon, and an ink-jet ink configured for printing on the printing medium. The ink-receiving layer can include semi-metal oxide or metal oxide particulates. The ink-jet ink can comprise a dye and a liquid vehicle carrying the dye. The liquid vehicle can include a sulfonated aromatic compound which is present in the ink-jet ink at an effective concentration to cause improvement of ozone fastness, wherein the dye and the sulfonated aromatic compound have an association on the media. The improvement can be determined by comparing the ozone fastness of the ink-jet ink with a control ink-jet ink that does not include the sulfonated aromatic compound.

In another embodiment, a method for printing images with improved ozone fastness can comprise the step of jetting an ink-jet ink onto a printing medium. The printing medium can include an ink-receiving layer coated thereon, and the ink-receiving layer can comprise semi-metal oxide or metal oxide particulates. The ink-jet ink can comprise a dye and a liquid vehicle carrying the dye, wherein the liquid vehicle includes a sulfonated aromatic compound being present in the ink-jet ink at an effective concentration to cause improvement of ozone fastness. Again, the improvement in ozone fastness can be determined by comparing the ozone fastness of the ink-jet ink with a control ink-jet ink that does not include the sulfonated aromatic compound.

Additional features and advantages of the invention will be apparent from the following detailed description which illustrates, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a dye" includes reference to one or more of such materials.

As used herein, "liquid vehicle" is defined to include liquid compositions that can be used to carry colorants to a substrate. Liquid vehicles are well known in the art, and a wide variety of vehicles may be used in accordance with embodiments of the present invention. Such vehicles may include a mixture of a variety of different agents, including without limitation, surfactants, solvents, co-solvents, buffers, biocides, viscosity modifiers, sequestering agents, stabilizing agents, and water. The liquid vehicle can also carry other compounds such as polymers, UV curable materials, plasticizers, and/or co-solvents in certain embodiments.

The term "control ink-jet ink" refers to ink-jet inks that are prepared in order to determine whether there is an improvement in ozone fastness for sulfonated aromatic-containing inks prepared in accordance with embodiments of the present invention. Typically, a control ink-jet ink is prepared by duplicating a sulfonated aromatic compound-containing ink, except for the replacement of the sulfonated aromatic compound with an equivalent amount of water. Thus, for each ink-jet ink of the present invention, the control ink-jet ink is relative to the specific ink-jet ink it is to be tested against. Typically, the ink-jet ink containing the sulfonated aromatic compound is tested against the control ink for ozone fastness by printing both inks identically on a media substrate (such as porous or other media) and testing the printed images in an ozone chamber at a controlled ozone concentration, relative humidity, and temperature. Failure of each printed sample can be defined as a predetermined percentage OD loss. If the printed sample prepared using the control ink fails prior to the ink-jet ink containing the sulfonated aromatic compound, then the sulfonated aromatic compound is said to have improved ozone fastness. For example, in one embodiment, the comparison of ozone fastness of an ink-jet ink containing a sulfonated aromatic compound with a control ink-jet ink can be carried out by several steps. These steps include: a) preparing a first printed sample including the ink-jet ink printed on a media substrate (such as commercially available porous media, for example, Epson Premium Glossy Photo Paper); b) preparing a second printed sample including the control ink-jet ink printed on the media substrate so that the second printed sample is substantially identical to the first printed sample; c) placing the first printed sample and the second printed sample in a chamber having a 1 ppm ozone level by volume, a relative humidity of 50%, and a temperature of 30° C.; and d) comparing time intervals required for each of the first printed sample and the second printed sample to reach failure in the chamber. In this embodiment, failure can be determined by 30%, 25%, and 25% optical density loss for cyan, magenta, and black inks, respectively, optical density loss compared to initial optical density. Thus, a longer time interval to failure of the first printed sample relative to the time interval to failure of the second printed sample indicates improvement in ozone fastness.

The term "effective concentration" when referring to an amount of the sulfonated aromatic compound that can be used to improve of ozone fastness, includes amounts that cause the sulfonated aromatic compound-containing ink-jet ink to outperform a control ink-jet ink. In other words, certain sulfonated aromatic compounds will work to improve ozone fastness within a concentration range or at other specific levels, and will not improve ozone fastness at other levels. Thus, an effective concentration of a sulfonated aromatic compound to improve ozone fastness includes any functional amount of that sulfonated aromatic compound, or combination of sulfonated aromatic compounds, that may be present in an ink-jet ink which improves ozone fastness over a control ink-jet ink.

The term "associated" when referring to an interaction between the dye and the sulfonated aromatic compound can include any number of molecular or supramolecular associations. Further, the association can occur in the ink-jet ink and/or once the ink-jet ink is printed on a media substrate. However, preferably, the association will at least be present once the ink-jet ink has been printed or applied to the media substrate, as it is on the media substrate where ozone fastness becomes a significant issue. Examples of associations include covalent bonding, hydrogen bonding, or ionic attraction, such as by complexation, chelation, or salt formation. Alternatively, association can be characterized by intercalation or other general attraction. In addition, the association can be an energy transfer between the dye and the sulfonated aromatic compound.

The term "about" when referring to a numerical value or range is intended to encompass the values resulting from experimental error that can occur when taking measurements.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In accordance with the present invention, an ink-jet ink can comprise a dye and a liquid vehicle carrying the dye. The liquid vehicle can include a sulfonated aromatic compound present in the ink-jet ink at an effective concentration to cause improvement of ozone fastness of the ink-jet ink. The improvement is determined by comparing the ozone fastness of the ink-jet ink with a control ink-jet ink that does not include the sulfonated aromatic compound.

In another embodiment, a printing system for creating images with improved ozone fastness can comprise a printing medium including an ink-receiving layer coated thereon, and an ink-jet ink configured for printing on the printing medium. The ink-receiving layer can include semi-metal oxide or metal oxide particulates. The ink-jet ink can comprise a dye and a liquid vehicle carrying the dye. The liquid vehicle can include a sulfonated aromatic compound which is present in the ink-jet ink at an effective concentration to cause improvement of ozone fastness, wherein the dye and the sulfonated aromatic compound exhibit an association on the media. The improvement can be determined by comparing the ozone fastness of the ink-jet ink with a control ink-jet ink that does not include the sulfonated aromatic compound.

In another embodiment, a method for printing images with improved ozone fastness can comprise the step of jetting an ink-jet ink onto a printing medium. The printing medium can include an ink-receiving layer coated thereon, and the ink-receiving layer can comprise semi-metal oxide or metal oxide particulates. The ink-jet ink can comprise a dye and a liquid vehicle carrying the dye, wherein the liquid vehicle includes a sulfonated aromatic compound being present in the ink-jet ink at an effective concentration to cause improvement of ozone fastness. Again, the improvement in ozone fastness can be determined by comparing the ozone fastness of the ink-jet ink with a control ink-jet ink that does not include the sulfonated aromatic compound.

Ink-Jet Ink Composition

In accordance with embodiments of the present invention, it has been discovered that certain sulfonated aromatic compounds can improve ozone fastness of ink-jet inks, particularly when printed on porous media substrates such as semi-metal oxide or metal oxide coated media substrates. These compounds are also particularly useful when added to dye-containing ink-jet inks, including ink-jet inks that utilize metallized dyes, such as copper- or nickel-containing dyes, though they are also useful in inks containing non-metallized dyes. Application of an ink-jet ink to a media substrate in accordance with embodiments of the present invention can be by thermal or piezo ink-jet application processes.

With respect to each of the composition, system, and method described herein, in certain preferred embodiments, the sulfonated aromatic compound can be a monosulfonated monoaromatic compound, a monosulfonated polyaromatic compound, a polysulfonated monoaromatic compound, or polysulfonated polyaromatic compound. Preferably, the sulfonated aromatic compound is polysulfonated and/or polyaromatic. Polysulfonated and/or polyaromatic compounds effective for use are shown, as follows:

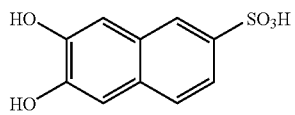

6,7-dihydroxy-2-naphthlenesulfonic acid

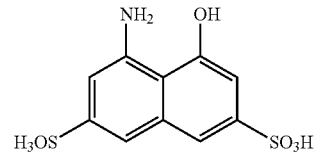

8-amino-1-naphthol-3,6-disulfonic acid

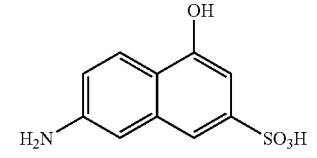

6-amino-1-naphthol-3-sulfonic acid

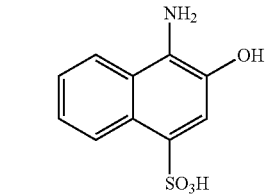

1-amino-4-naphthol-4-sulfonic acid

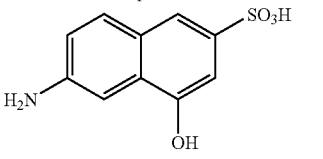

6-amino-4-hydroxy-2-naphthalenesulfonic acid

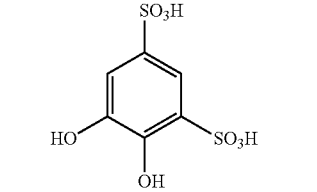

4,5-dihydroxy-1,3-benzenedisulfonic acid

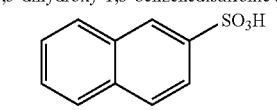

naphthalene-2-sulfonic acid

The above exemplary polysulfonated and/or polyaromatic compounds depict one or two aromatic moieties in the form of a benzene ring or a naphthalene ring. However, it is recognized that larger fused or unfused polyaromatic ring structures can likewise be used, e.g., other aromatic carbon ring nuclei such as anthracene or even heterocyclic aromatic nuclei. This being stated, aromatic hydrocarbons are preferred. Likewise, each of the examples shown includes one or two sulfonate groups. It is recognized that three or more sulfonate groups can alternatively be present, depending on the particular application and desired result. The aromatic rings may also, in addition to the sulfonate group(s), have substituents such as aryl, alkyl, alkenyl, alkynyl, and/or other hydrocarbon-derived species which include elements other than carbon or hydrogen.

In accordance with embodiments of the present invention, the sulfonated aromatic compound can be present in the ink-jet ink composition at an effective concentration to improve ozone fastness compared to a control ink-jet ink that does not include the sulfonated aromatic compound. Typically, this concentration can be from 0.01 wt % to 10 wt %, though this range is not intended to be limiting. This being stated, ranges should be determined on a case by case basis, depending on vehicle components, specific dye(s), and/or specific sulfonated aromatic compound(s) selected for use, as would be ascertainable by one skilled in the art after considering the present disclosure. Some specific sulfonated aromatic compounds may actually have a more narrow functional range, and other may have a broader functional range. As a result, specific examples of sulfonated aromatic compounds described herein that show a lack of ozone fastness improvement at a specific amount in a particular ink are not necessarily excluded from the present invention, as they may be effective in other inks or at other concentrations at reducing ozone fade.

As mentioned, the ink-jet ink compositions of the present invention are typically prepared in an aqueous formulation or liquid vehicle which can include water, co-solvents, surfactants, buffering agents, biocides, sequestering agents, viscosity modifiers, humectants, and/or other known compounds. In one aspect of the present invention, the liquid vehicle can comprise from about 70 wt % to about 99.9 wt % by weight of the ink-jet ink composition. In another aspect, other than the colorant, liquid vehicle can also carry polymeric binders, polymeric latex, and/or other chemical compounds.

As described, co-solvents can be included in the ink-jet compositions of the present invention. Suitable co-solvents for use in the present invention include water soluble organic co-solvents, but are not limited to, aliphatic alcohols, aromatic alcohols, diols, glycol ethers, poly(glycol)ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol)alkyl ethers, higher homologs of poly(propylene glycol)alkyl ethers, lactams, substituted formamides, unsubstituted formamides, substituted acetamides, and unsubstituted acetamides. Specific examples of co-solvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, 1-(2-hydroxyethyl)-2-pyrrolidone, tetraethylene glycol, and 1,3-dimethyl-2-imidazolidinone.

Co-solvents can be added to reduce the rate of evaporation of water in the ink-jet to minimize clogging or optimize other properties of the ink such as viscosity, pH, surface tension, optical density, and print quality. The co-solvent concentration can range from about 0.1 wt % to about 40 wt %, and in one embodiment is from about 5 wt % to about 15 wt %. Multiple co-solvents can also be used, as is known in the art.

Various buffering agents or pH adjusting agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the bleed control or optical density characteristics of the present invention. If used, buffering agents typically comprise less than about 10 wt % of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.1 wt % to about 0.25 wt %.

One or more of various surfactants can also be used as are known by those skilled in the art of ink formulation. Non-limiting examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, commercial products such as TERGITOLS, SURFYNOLS, ZONYLS, TRITONS, MERPOLS, and combinations thereof. The amount of surfactant added to the ink-jet inks of this invention can range from 0 wt % to 10 wt %.

In one embodiment of the present invention, the ink-jet ink can be configured for application from a thermal ink-jet pen.

Porous Coated Media

In accordance with one aspect of the present invention, systems and methods are provided that utilize a media substrate coated with an ink-receiving layer. The coated print media typically includes a substrate and a porous ink-receiving layer deposited on the substrate. The substrate can be paper, plastic, coated paper, fabric, art paper, or other known substrate used in the ink-jet printing arts. In one embodiment, photobase can be used as the substrate. Photobase is typically a three-layered system comprising a single layer of paper sandwiched by two polymeric layers, such as polyethylene layers.

With respect to the porous ink-receiving layer, inorganic semi-metal or metal oxide particulates, a polymeric binder, and optionally, mordants and/or other porous coating composition agents can be present. In one embodiment, the inorganic semi-metal or metal oxide particulates can be silica, alumina, boehmite, silicates (such as aluminum silicate, magnesium silicate, and the like), titania, zirconia, calcium carbonate, clays, and combinations thereof. In a more detailed aspect, the particulates can be alumina, silica, or aluminosilicate. Each of these inorganic particulates can be dispersed throughout a porous coating composition, which can be applied to a media substrate to form the porous ink-receiving layer.

In order to bind the inorganic particulates together in the porous coating composition, a polymeric binder is typically included. Exemplary polymeric binders that can be used include polyvinyl alcohol including water-soluble copolymers thereof; polyvinyl acetate; polyvinyl pyrrolidone; modified starches including oxidized and etherified starches; water soluble cellulose derivatives including carboxymethyl cellulose, hydroxyethyl cellulose; polyacrylamide including its derivatives and copolymers; casein; gelatin; soybean protein; silyl-modified polyvinyl alcohol; conjugated diene copolymer latexes including maleic anhydride resin, styrene-butadiene copolymer, and the like; acrylic polymer latexes including polymers and copolymers of acrylic and methacrylic acids, and the like; vinyl polymer latexes including ethylene-vinyl acetate copolymers; functional group-modified latexes including those obtained by modifying the above-mentioned polymers with monomers containing functional groups (e.g. carboxyl, amino, amido, sulfo, etc.); aqueous binders of thermosetting resins including melamine resins, urea resin, and the like; synthetic resin binders including polymethyl methacrylate, polyurethane resin, polyester resin, amide resin, vinyl chloride-vinyl acetate copolymer, polyvinyl butyral, and alkyl resins.

Optionally, the porous ink-receiving layer can also be modified with an ionic binding species or mordant known to interact with a predetermined class of colorants, thereby increasing permanence. Aside from mordants, other optional components that can be present in the porous ink-receiving layer can include anionic surfactants, cationic surfactants, biocides, plasticizers, optical brighteners, viscosity modifiers, leveling agents, UV absorbers, hindered amine stabilizers, anti-ozonants, silane coupling agents, and/or other known additives. In addition, the semi-metal oxide or metal oxide particulates can be chemically surface-modified using silane coupling agents having functional moieties attached thereto.

The ink-receiving layer can be a single layer or multilayer coating designed to absorb sufficient quantities of ink to produce high quality printed images. The coating composition may be applied to the media substrate to form the ink-receiving layer by any means known to one skilled in the art, including blade coating, air knife coating, rod coating, wire rod coating, roll coating, slot coating, slide hopper coating, gravure, curtain, and cascade coating. The ink-receiving layer can be printed on one or both sides of the media substrate.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

Example 1

Ink-Jet Ink Preparation

Several experimental and control ink-jet ink compositions were prepared according to the compositions listed in Table 1 below:

TABLE 1

Ink-jet ink compositions

| Components | Experimental Ink | Control Ink |
|---|---|---|
| [1]Dye | 0.8-2 wt % | 0.8-2 wt % |
| Diethylene glycol | 10 wt % | 10 wt % |
| Triton X-100 | 1.5 wt % | 1.5 wt % |
| Trizma (Tris buffer) | 0.2 wt % | 0.2 wt % |
| [2]Sulfonated aromatic compound | 2-3 wt % | 0 wt % |
| Water | Balance | Balance |

[1]The dyes and amounts used are listed in Tables 2-4 below.
[2]The sulfonated aromatic compounds are listed in Tables 2-4 below.

Example 2

Evaluation of Ozone Fastness of Ink-Jet Inks Printed on Porous Media

Various experimental ink-jet inks which included various dyes and sulfonated aromatic compounds were compared to corresponding control ink-jet inks which did not contain the sulfonated aromatic compound to determine the effectiveness of the sulfonated aromatic compound on ozone fastness. Epson Premium Glossy Photo Paper was chosen as the porous media for these experiments. Printed samples at two levels of optical density (OD), 0.6 and 1.0, were evaluated. In this example, each printed sample was placed in a chamber having a 1 ppm ozone level by volume, a relative humidity of 50%, and a temperature of 30° C. Failure of each printed sample was defined as 30%, 25%, and 25% OD loss for cyan, magenta, and black inks, respectively. Even small OD losses are noticeable to the average person. The results are summarized in Tables 2 to 4 below with respect to different metallized and non-metallized dyes. A value of greater than 100 indicates improvement in ozone fastness, whereas a value at or less than 100 indicates that no improvement was achieved with respect to ozone fastness.

In Table 2, the ozone fastness was evaluated using a copper phthalocyanine dye, DB199 Na, with various sulfonated aromatic compounds. As can be seen in Table 2 below, at both levels of optical density, i.e., 0.6 and 1.0, the sulfonated aromatic compounds that showed effectiveness in improving the ozone fastness were 6,7-dihydroxy-2-naphthalene, 6-amino-1-naphthol-3-sulfonic acid, 6-amino-4-hydroxy-2-naphthalene-sulfonic acid, naphthalene-2-sulfonic acid (Na salt), 8-amino-1-naphthol-3,6-disulfonic acid (disodium salt), and 4,5-dihydroxy-1,3-benzenedisulfonic acid. The 1-amino-2-naphthol-4-sulfonic acid composition showed relatively neutral results.

TABLE 2

Ozone fastness improvement with copper phthalocyanine dye (2 wt % DB199 Na) and sulfonated aromatic compounds

| Sulfonated Aromatic Compound (2 wt %) | 0.6 Initial OD % Improvement vs. Control | 1.0 Initial OD % Improvement vs. Control |
|---|---|---|
| 6,7-dihydroxy-2-naphthalene | 129 (0.5 Initial OD) | 138 |
| 6-amino-1-naphthol-3-sulfonic acid | 178 | 173 |
| 6-amino-4-hydroxy-2-naphthalene-sulfonic acid | 153 | 157 |
| naphthalene-2-sulfonic acid, Na salt | 137 | 127 |
| 8-amino-1-naphthol-3,6-disulfonic acid, disodium salt | 141 | 131 |
| 1-amino-2-naphthol-4-sulfonic acid | 102 | 96 |
| 4,5-dihydroxy-1,3-benzenedisulfonic acid | 140 | 148 |

In Table 3 below, the ozone fastness was evaluated using a non-metallized xanthene dye, namely Acid Red 52 sodium salt (or AR52Na), using two different sulfonated aromatic compounds. At both levels of optical density, i.e. 0.6 and 1.0, both 6-amino-1-naphthol-3-sulfonic acid and 6-amino-4-hydroxy-2-naphthalene-sulfonic acid were found to be effective in improving the ozone fastness comparing to that of a control ink.

TABLE 3

Ozone fastness improvement with Acid Red 52 (2 wt %) and sulfonated aromatic compounds

| Sulfonated Aromatic Compound (2 wt %) | 0.6 Initial OD % Improvement vs. Control | 1.0 Initial OD % Improvement vs. Control |
|---|---|---|
| 6-amino-1-naphthol-3-sulfonic acid | 112 | 122 |
| 6-amino-4-hydroxy-2-naphthalene-sulfonic acid | 117 | 128 |

In Table 4 below, the ozone fastness was evaluated using a metallized azo dye, i.e. DJR 814, using two different sulfonated aromatic compounds. At both levels of optical density, i.e. 0.6 and 1.0, both 6-amino-1-naphthol-3-sulfonic acid and 6-amino-4-hydroxy-2-naphthalene-sulfonic acid were found to be effective in improving the ozone fastness comparing to that of a control ink.

TABLE 4

Ozone fastness improvement with DJR 814 dye (1.8 wt %) and sulfonated aromatic compounds

| Sulfonated Aromatic Compound (2 wt %) | 0.6 Initial OD % Improvement vs. Control | 1.0 Initial OD % Improvement vs. Control |
|---|---|---|
| 6-amino-1-naphthol-3-sulfonic acid | 105 | 107 |
| 6-amino-4-hydroxy-2-naphthalene-sulfonic acid | 107 | 107 |

TABLE 5

Ozone fastness improvement with K820 (a non-metallized trisazo) dye
(1 wt %) and sulfonated aromatic compounds

| Sulfonated Aromatic Compound (3 wt %) | 0.6 Initial OD % Improvement vs. Control | 1.0 Initial OD % Improvement vs. Control |
|---|---|---|
| 1,3-benzenedisulfonic acid | 127 | 111 |
| Anthraquinone-2-sulfonic acid, sodium salt | 104 | 97 |

As can be seen from Tables 2-5, many ink-jet inks showed an improvement in ozone fastness when the ink-jet ink included a sulfonated aromatic compound. Though the above tables tend to show positive results, it should be noted that some of sulfonated aromatic compounds can also produce relatively neutral results with respect to reducing ozone fade. Thus, though certain classes of materials have been discovered to reduce ozone fade in a general sense, this does not necessarily mean that each and every material in a particular class will be as effective as the materials tested in the above examples at every concentration within the presently disclosed ranges. Thus, to the extent that individual compounds within these classes promote ozone fastness improvement in a given ink at a given concentration, they are included in accordance with embodiments of the present invention.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. An ink-jet ink composition, comprising:
a dye; and
a liquid vehicle carrying the dye, said liquid vehicle including a sulfonated aromatic compound selected from the group consisting of 6,7-dihydroxy-2-naphthalene-sulfonic acid, 6-amino-1-naphthol-3-sulfonic acid, 6-amino-4-hydroxy-2-naphthalene-sulfonic acid, naphthalene-2-sulfonic acid, 8-amino-1-naphthol-3,6-disulfonic acid, 1-amino-2-naphthol-4-sulfonic acid, 4,5-dihydroxy-1,3-benzenedisulfonic acid, 1,3-benzenedisulfonic acid, anthraquinone-2-sulfonic acid, and mixtures and salts thereof, present in the ink-jet ink at an effective concentration to cause improvement of ozone fastness of said ink-jet ink, wherein the improvement is determined by comparing the ozone fastness of the ink-jet ink with a control ink-jet ink that does not include the sulfonated aromatic compound.

2. An ink-jet ink as in claim 1, wherein the dye is a metallized dye.

3. An ink-jet ink as in claim 1, wherein the dye is a non-metallized dye.

4. An ink-jet ink as in claim 1, wherein the dye is present in the ink-jet ink composition at from 0.01 wt % to 10 wt %.

5. An ink-jet ink as in claim 1, wherein the sulfonated aromatic compound is present in the ink-jet ink composition at from 0.01 wt % to 10 wt %.

6. An ink-jet ink as in claim 1, wherein the sulfonated aromatic compound is a monosulfonated polyaromatic compound.

7. An ink-jet ink as in claim 1, wherein the sulfonated aromatic compound is a polysulfonated monoaromatic compound.

8. An ink-jet ink as in claim 1, wherein the sulfonated aromatic compound is a polysulfonated polyaromatic compound.

9. An ink-jet ink as in claim 1, wherein the sulfonated aromatic compound is a monosulfonated monoaromatic compound.

10. An ink-jet ink as in claim 1, wherein the aromatic portion of the sulfonated aromatic compound is a benzene ring, a naphthalene ring, or an anthracene ring.

11. An ink-jet ink as in claim 1, wherein the sulfonated aromatic compound is associated with the dye in the ink-jet ink.

12. An ink-jet ink as in claim 1, wherein the sulfonated aromatic compound is associated with the dye when the composition is printed onto a substrate.

13. An ink-jet ink as in claim 1, wherein the sulfonated aromatic compound is derivatized with a pendent substituent group selected from the group consisting of aryl, alkyl, alkenyl, alkynyl, nitrogen-containing hydrocarbons, oxygen-containing hydrocarbons, and sulfur-containing hydrocarbons other than the sulfonated portion of the compound.

14. An ink-jet ink as in claim 1, wherein the sulfonated aromatic compound is selected from the group consisting of 6-amino-1-naphthol-3-sulfonic acid, 6-amino-4-hydroxy-2-naphthalene-sulfonic acid, and mixtures and salts thereof.

15. A printing system for creating images with improved ozone fastness, comprising:
a) a printing medium including an ink-receiving layer coated thereon, said ink-receiving layer including semi-metal oxide or metal oxide particulates; and
b) an ink-jet ink configured for printing on printing medium, said ink-jet ink, comprising:
i) a dye; and
ii) a liquid vehicle carrying the dye, said liquid vehicle including a sulfonated aromatic compound selected from the group consisting of 6,7-dihydroxy-2-naphthalene-sulfonic acid, 6-amino-1-naphthol-3-sulfonic acid, 6-amino-4-hydroxy-2-naphthalene-sulfonic acid, naphthalene-2-sulfonic acid, 8-amino-1-naphthol-3,6-disulfonic acid, 1-amino-2-naphthol-4-sulfonic acid, 4,5-dihydroxy-1,3-benzenedisulfonic acid, 1,3-benzenedisulfonic acid, anthraquinone-2-sulfonic acid, and mixtures and salts thereof, being present in the ink-jet ink at an effective concentration to cause improvement of ozone fastness, wherein the dye and the sulfonated aromatic compound have an association on the media, and wherein the improvement is determined by comparing the ozone fastness of the ink-jet ink with a control ink-jet ink that does not include the sulfonated aromatic compound.

16. A printing system as in claim 15, wherein the sulfonated aromatic compound is present in the ink jet ink composition at from 0.01 wt % to 10 wt %, and the dye is present in the ink-jet ink composition at from 0.01 wt % to 10 wt %.

17. A printing system as in claim 15, wherein the dye is a metallized dye.

18. A printing system as in claim 15, wherein the dye is a non-metallized dye.

19. A printing system as in claim 15, wherein the dye is present in the ink jet ink composition at from 0.01 wt % to 10 wt %.

20. A printing system as in claim 15, wherein the sulfonated aromatic compound is present in the ink-jet ink composition at from 0.01 wt % to 10 wt %.

21. A printing system as in claim 15, wherein the sulfonated aromatic compound is a monosulfonated polyaromatic compound.

22. A printing system as in claim 15, wherein the sulfonated aromatic compound is a polysulfonated monoaromatic compound.

23. A printing system as in claim 15, wherein the sulfonated aromatic compound is a polysulfonated polyaromatic compound.

24. A printing system as in claim 15, wherein the sulfonated aromatic compound is a monosulfonated monoaromatic compound.

25. A printing system as in claim 15, wherein the aromatic portion of the sulfonated aromatic compound is a benzene ring, a naphthalene ring, or an anthracene ring.

26. A printing system as in claim 15, wherein the sulfonated aromatic compound is associated with the dye in the ink-jet ink.

27. A printing system as in claim 15, wherein the sulfonated aromatic compound becomes associated with the dye when the composition is printed onto a substrate.

28. A printing system as in claim 15, wherein the sulfonated aromatic compound is derivatized with a pendent substituent group selected from the group consisting of aryl, alkyl, alkenyl, alkynyl, nitrogen-containing hydrocarbons, oxygen-containing hydrocarbons, and sulfur-containing hydrocarbons other than the sulfonated portion of the compound.

29. A printing system as in claim 15, wherein the semi-metal oxide or metal oxide particulates are selected from the group consisting of silica, alumina, boehmite, silicates, titania, zirconia, calcium carbonate, clays, and combinations thereof.

30. (previously presented A printing system as in claim 15, wherein the sulfonated aromatic compound is selected from the group consisting of 6-amino-1-naphthol-3-sulfonic acid, 6-amino-4-hydroxy-2-naphthalene-sulfonic acid, and mixtures and salts thereof.

31. A method for printing images with improved ozone fastness, comprising jetting an ink-jet ink onto a printing medium, said printing medium including an ink- receiving layer coated thereon, said ink-receiving layer comprising semi-metal oxide or metal oxide particulates, said ink-jet ink comprising a dye, and a liquid vehicle carrying the dye, said liquid vehicle including a sulfonated aromatic compound selected from the group consisting of 6,7-dihydroxy-2-naphthalene-sulfonic acid, 6-amino-1-naphthol-3-sulfonic acid, 6-amino-4- hydroxy-2-naphthalene-sulfonic acid, naphthalene-2-sulfonic acid, 8-amino-1-naphthol-3,6-disulfonic acid, 1-amino-2-naphthol-4-sulfonic acid, 4,5-dihydroxy-1,3-benzenedisulfonic acid, 1,3-benzenedisulfonic acid, anthraquinone-2-sulfonic acid, and mixtures and salts thereof, being present in the ink-jet ink at an effective concentration to cause improvement of ozone fastness, wherein the improvement is determined by comparing the ozone fastness of the ink jet ink with a control ink-jet ink that does not include the sulfonated aromatic compound.

32. A method as in claim 31, wherein the sulfonated aromatic compound is present in the ink jet ink composition at from 0.01 wt % to 10 wt %, and wherein the dye is present in the ink-jet ink composition at from 0.01 wt % to 10 wt %.

33. A method as in claim 31, wherein the sulfonated aromatic compound is a monosulfonated polyaromatic compound.

34. A method as in claim 31, wherein the sulfonated aromatic compound is a polysulfonated monoaromatic compound.

35. A method as in claim 31, wherein the sulfonated aromatic compound is a polysulfonated polyaromatic compound.

36. A method as in claim 31, wherein the sulfonated aromatic compound is a monosulfonated monoaromatic compound.

37. A method as in claim 31, wherein the aromatic portion of the sulfonated aromatic compound is a benzene ring, a naphthalene ring, or an anthracene ring.

38. A method as in claim 31, wherein the sulfonated aromatic compound is associated with the dye in the ink-jet ink.

39. A method as in claim 31, wherein the sulfonated aromatic compound is associated with the dye when the composition is printed onto a substrate.

40. A method as in claim 31, wherein the sulfonated aromatic compound is derivatized with a pendent substituent group selected from the group consisting of aryl, alkyl, alkenyl, alkynyl, nitrogen-containing hydrocarbons, oxygen-containing hydrocarbons, and sulfur-containing hydrocarbons other than the sulfonated portion of the compound.

41. A method as in claim 31, wherein the semi-metal oxide or metal oxide particulates are selected from the group consisting of silica, alumina, boehmite, silicates, titania, zirconia, calcium carbonate, clays, and combinations thereof.

42. A method as in claim 31, wherein the jetting step is by a thermal ink-jetting process.

43. A method as in claim 31, wherein the sulfonated aromatic compound is selected from the group consisting of 6-amino-1-naphthol-3-sulfonic acid, 6-amino-4-hydroxy-2-naphthalene-sulfonic acid, and mixtures and salts thereof.

44. An ink-jet ink as in claim 1, wherein the improvement provides at least a 100% improvement as compared to the control ink-jet ink at an optical density level of 1.0

45. An ink-jet ink as in claim 1, wherein the improvement provides at least a 120% improvement as compared to the control ink-jet ink at an optical density level of 1.0.

46. A printing system as in claim 15, wherein the improvement provides at least a 100% improvement as compared to the control ink-jet ink at an optical density level of 1.0.

47. A printing system as in claim 15, wherein the improvement provides at least a 120% improvement as compared to the control ink-jet ink at an optical density level of 1.0.

48. A method as in claim 31, wherein the improvement provides at least a 100% improvement as compared to the control ink jet ink at an optical density level of 1.0.

49. A method as in claim 31, wherein the improvement provides at least a 120% improvement as compared to the control ink jet ink at an optical density level of 1.0.

50. An ink-jet ink composition, comprising:
a metallized dye; and
a liquid vehicle carrying the metallized dye, said liquid vehicle including a sulfonated aromatic compound selected from the group consisting of 6-amino-1-naphthol-3-sulfonic acid, 6- amino-4-hydroxy-2-naphthalene-sulfonic acid, and mixtures and salts thereof; the sulfonated aromatic compound present in the ink-jet ink at an effective concentration to cause improvement of ozone fastness of said ink-jet ink, wherein the improvement is determined by comparing the ozone fastness of the ink jet ink with a control ink jet ink that does not include the sulfonated aromatic compound.

* * * * *

UNITED STATES PATENT AND TRADEMARK OFFICE
CERTIFICATE OF CORRECTION

PATENT NO. : 7,976,623 B2
APPLICATION NO. : 11/109899
DATED : July 12, 2011
INVENTOR(S) : Linda C Uhlir-Tsang et al.

It is certified that error appears in the above-identified patent and that said Letters Patent is hereby corrected as shown below:

In column 12, line 52, in Claim 16, delete "ink jet" and insert -- ink-jet --, therefor.

In column 12, line 60, in Claim 19, delete "ink jet" and insert -- ink-jet --, therefor.

In column 13, line 31, in Claim 30, before "A" delete "(previously presented".

In column 13, line 45, in Claim 31, delete "4- hydroxy" and insert -- 4-hydroxy --, therefor.

In column 13, line 53, in Claim 31, delete "ink jet" and insert -- ink-jet --, therefor.

In column 13, line 56, in Claim 32, delete "ink jet" and insert -- ink-jet --, therefor.

In column 14, line 33, in Claim 44, delete "1.0" and insert -- 1.0. --, therefor.

In column 14, line 45, in Claim 48, delete "ink jet" and insert -- ink-jet --, therefor.

In column 14, line 48, in Claim 49, delete "ink jet" and insert -- ink-jet --, therefor.

In column 14, line 54, in Claim 50, delete "6- amino" and insert -- 6-amino --, therefor.

In column 14, line 60, in Claim 50, after "the" delete "ink jet" and insert -- ink-jet --, therefor.

In column 14, line 60, in Claim 50, after "control" delete "ink jet" and insert -- ink-jet --, therefor.

Signed and Sealed this
Twentieth Day of March, 2012

David J. Kappos
*Director of the United States Patent and Trademark Office*